United States Patent
Voronka et al.

(10) Patent No.: US 7,073,752 B2
(45) Date of Patent: Jul. 11, 2006

(54) AUTOMATIC RESERVE OR PRIMARY PARACHUTE ACTIVATION DEVICE

(75) Inventors: Nestor Voronka, Seattle, WA (US); Charles J. Jacobus, Ann Arbor, MI (US); Derek M. Johnson, Ypsilanti, MI (US); Pavan Namineni, Ann Arbor, MI (US)

(73) Assignee: Cybernet Systems Corporation, Ann Arbor, MI (US)

( * ) Notice: Subject to any disclaimer, the term of this patent is extended or adjusted under 35 U.S.C. 154(b) by 0 days.

(21) Appl. No.: 10/972,703

(22) Filed: Oct. 25, 2004

(65) Prior Publication Data

US 2005/0127243 A1 Jun. 16, 2005

Related U.S. Application Data

(60) Provisional application No. 60/514,416, filed on Oct. 24, 2003.

(51) Int. Cl.
*B64D 17/54* (2006.01)
(52) U.S. Cl. ..................... 244/149; 244/152
(58) Field of Classification Search .............. 244/142, 244/152, 147–149; 438/119; 342/62; 701/3, 701/215
See application file for complete search history.

(56) References Cited

U.S. PATENT DOCUMENTS

| | | | |
|---|---|---|---|
| 3,421,720 A * | 1/1969 | MacDonald, Jr. et al. | 244/122 R |
| 3,992,999 A | 11/1976 | Chevrier et al. | 102/70 B |
| 4,858,856 A | 8/1989 | Cloth | 244/149 |
| 4,865,273 A | 9/1989 | Jones | 244/149 |
| 5,222,697 A | 6/1993 | Allen | 244/149 |
| 5,825,667 A | 10/1998 | Van Den Broek | 364/562 |
| 6,232,150 B1 * | 5/2001 | Lin et al. | 438/119 |
| 6,378,808 B1 | 4/2002 | Smolders | 244/149 |
| 6,724,341 B1 * | 4/2004 | Pereira et al. | 342/62 |
| 6,754,584 B1 * | 6/2004 | Pinto et al. | 701/215 |

* cited by examiner

*Primary Examiner*—Galen Barefoot
(74) *Attorney, Agent, or Firm*—Gifford, Krass, Groh, Sprinkle, Anderson & Citkowski, PC

(57) ABSTRACT

An electronic automatic reserve or primary parachute activation device incorporates partial or complete capture of freefaller or tethered parachute jumper kinematics to rapidly and reliable determine when to automatically activate deployment of the primary or reserve chute. This device uses means for directly measuring acceleration, velocity and/or position in addition to air pressure change to enable reliable detection of chute deployment conditions earlier than is possible with conventional pressure change activated automated activations devices. This is important when the activation decision must be made within 5–10 seconds of the initiation of the jump as is the case for military low altitude parachuting.

13 Claims, 12 Drawing Sheets

AUTOMATIC RESERVE OR PRIMARY PARACHUTE ACTIVATION DEVICE

REFERENCE TO RELATED APPLICATION

This application claims priority from U.S. Provisional Patent Application Ser. No. 60/514,416, filed Oct. 24, 2003, the entire content of which is incorporated herein by reference.

FIELD OF THE INVENTION

This invention pertains to a method and design of automated parachute activation devices that can reliably determine chute release time in low altitude jump scenarios that are typical of military jumps and precision airdrop.

BACKGROUND OF THE INVENTION

Parachuting is a dangerous activity. If the primary parachute fails to deploy either due to malfunction or incapacity of the jumper, the reserve chute must be deployed with enough time to reduce the jumper's downward velocity to safe levels for ground contact. If the primary does not properly deploy and the reserve either does not deploy or does not deploy early enough, the jump will be fatal.

Recreational jumpers generally jump from a high altitude (nominally 5000 ft. above ground) to get the maximum flying time. Automated activations devices (AADs) like those made commercially by Airtec and Astra are used by jumpers in training to safely deploy the reserve chute if the inexperienced jumper goes too low before pulling the main (or if the main is inoperative or the jumper is incapacitated). These conventional AADs detect the jumper's altitude using air pressure above sea level either mechanically or electronically. When the altitude detected is about 1000 ft. above the ground level (these devices must be calibrated at ground level to set how high this is above sea level), these devices activate an automated actuation that deploys the reserve. U.S. Pat. No. 5,222,697 to Allen and U.S. Pat. No. 3,992,999 to Chevrier, et al. show typical actuation systems.

Because there is a relatively long period for safe determination that the main cute has not been deployed in recreational parachuting, current AADs use relatively in accurate pressure sensing to determine the correct time for reserve chute deployment. U.S. Pat. No. 4,858,856 to Cloth and U.S. Pat. No. 4,865,273 to Jones describe a purely mechanical pressure (i.e. altitude) detection systems that activate chute deployment. U.S. Pat. No. 5,825,667 to Van Den Broek describes a device the includes a data processing and an electronic pressure sensor that is used to determine height and an acceleration sensor that is used to compute a redundant height parameter to improve height determination accuracy if the jumper is oriented in the proper way (as detected by a tilt sensor). U.S. Pat. No. 6,378,808 to Smolders also uses an electronic means or measuring altitude as the prime determiner of parachute release time, but does the computation through a complex table driven model computed by an electronic processor. The currently available commercial AADs like the Astra or the Cypress (from Airtec) also uses barometric pressure and pressure changes to determine altitude and rate of decent.

The assumption in all of these prior AAD systems is that pressure change (i.e. altitude based on pressure adjusted for the pressure at ground level) is accurate enough for determination when to deploy the reserve chute (or in the case of an automated chute deployment the main chute). U.S. Pat. No. 5,825,667 acknowledges the accuracy limitations of this approach and incorporates a one axis accelerometer that can be used to improve this height estimate if the tilt sensor indicate that the jumper is in the proper downward facing orientation, but in all of these prior approach there is an assumption that accurate kinematics determination sensing is expensive and therefore should not be used or used in limited ways.

With the advent of low cost position, velocity, and acceleration measurement devices this assumption is no longer valid. While pressure sensing is still an important component to AAD operation, it can now be augment by partial or completely solved jumper kinematic parameter measurement starting at the point of departure from the aircraft down to the point of ground contact. All relevant function and failure mode conditions can be determined and used to trigger reliable reserve (or primary) chute deployment based on both kinematic parameters and pressure-derived altitude measurements.

The addition of direct kinematic measurement to the deployment decision is critical for determination of primary chute failure is low altitude military jumps within approximately the first 5 seconds of the jump and for accurate deployment of the main for precision airdrop.

SUMMARY OF THE INVENTION

This invention is directed to an electronic automatic reserve or primary parachute activation device. The system incorporates partial or complete capture of freefaller or tethered parachute jumper kinematics to rapidly and reliable determine when to automatically activate deployment of the primary or reserve chute.

The preferred embodiments use one or more devices for directly measuring acceleration, velocity and/or position in addition to air pressure change to enable reliable detection of chute deployment conditions earlier than is possible with conventional pressure change activated automated activations devices.

The devices used by the invention may include MEMS accelerometers and/or a MEMS gyroscope.

DETAILED DESCRIPTION OF THE INVENTION

Military training parachute jumps are often done from 800 ft and can be conducted from even lower. The main chute is deployed by a static line that is attached to the main chute and the aircraft from which the jumper exits. The human body achieves terminal velocity in approximately 5 seconds from exiting the aircraft so each second after this that the main parachute is not properly deployed will take the jumper down approximately 172 feet. Four hundred feet is approximately the last moment when the soldier's reserve can be deployed for a safe landing so there is only 5–7 seconds in which the soldier can decide if this action is warranted. This response time is very challenging, if possible at all.

If the automated opening device is for precision airdrop, i.e. operates the main chute, each second delay in opening will result in between 130 and 260 ft error in the final payload touchdown point.

Figure 1:
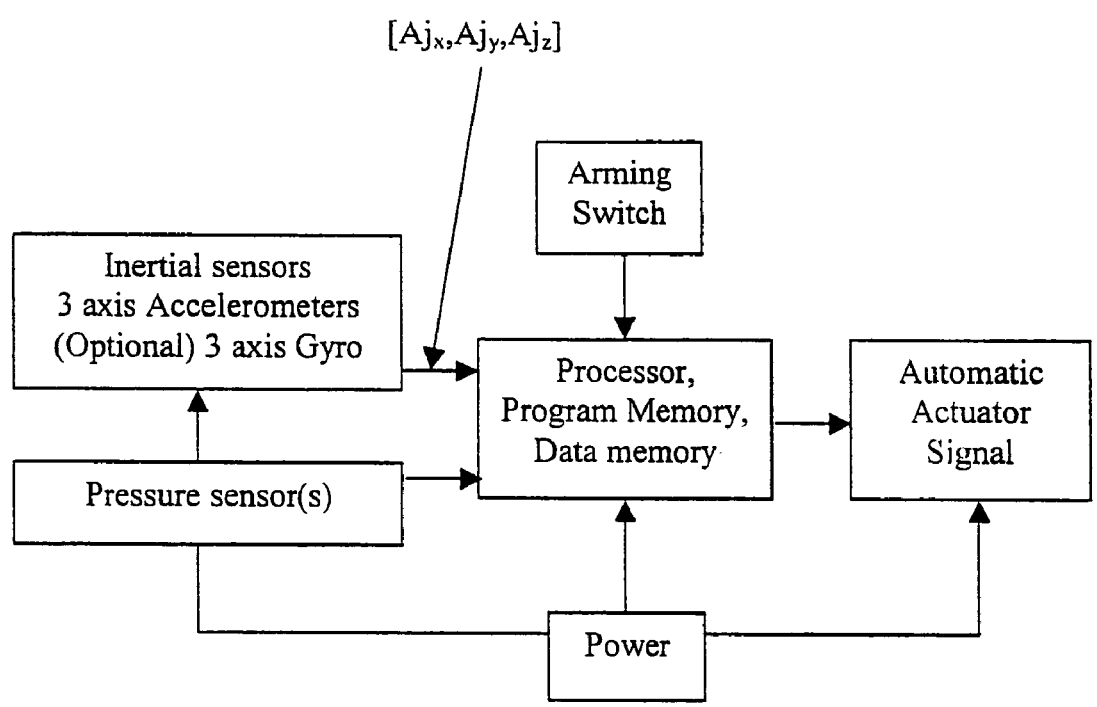
FIG. 1 shows the basic MEMS-based automated activation device (AAD)

The system implemented by the inventors (FIG. 1 shows the basic MEMS-based AAD) couples low cost micromechanical (MEMS) accelerometers and optionally MEMS gyroscopes to allow computation of partially or completely specified jumper kinematics (with three orthogonally oriented accelerometers we assume that the jumper is not tumbling and compute a positions and velocity solution by integrating accelerometer outputs and when three orthogonally oriented gyroscopes are added we compute positions, orientation, and rates of change of both of these). Adding these orientation-free kinematics sensors does not add undue cost because MEMS devices, such as those used in commercial airbag deployment, are inexpensive. Jumper velocity $[Vj_x, Vj_y, Vj_z]$ and position $[Pj_x, Pj_y, Pj_z]$ can be computed by numerically evaluating:

$$[Vj_x, Vj_y, Vj_z] = [Va_x, Va_y, Va_z] + \int [Aj_x, Aj_y, Aj_z] dt \quad (1)$$

$$[Pj_x, Pj_y, Pj_z] = [Pa_x, Pa_y, Pa_z] + \int [Vj_x, Vj_y, Vj_z] dt \quad (2)$$

Where:

$[Aj_x, Aj_y, Aj_z]$ is the measured jumper's accelerations, $[Va_x, Va_y, Va_z]$ and $[Pa_x, Pa_y, Pa_z]$ are the aircraft's velocity and position, and $[Vj_x, Vj_y, Vj_z]$ and $[Pj_x, Pj_y, Pj_z]$ are the jumper's velocity and position.

Figure 2:
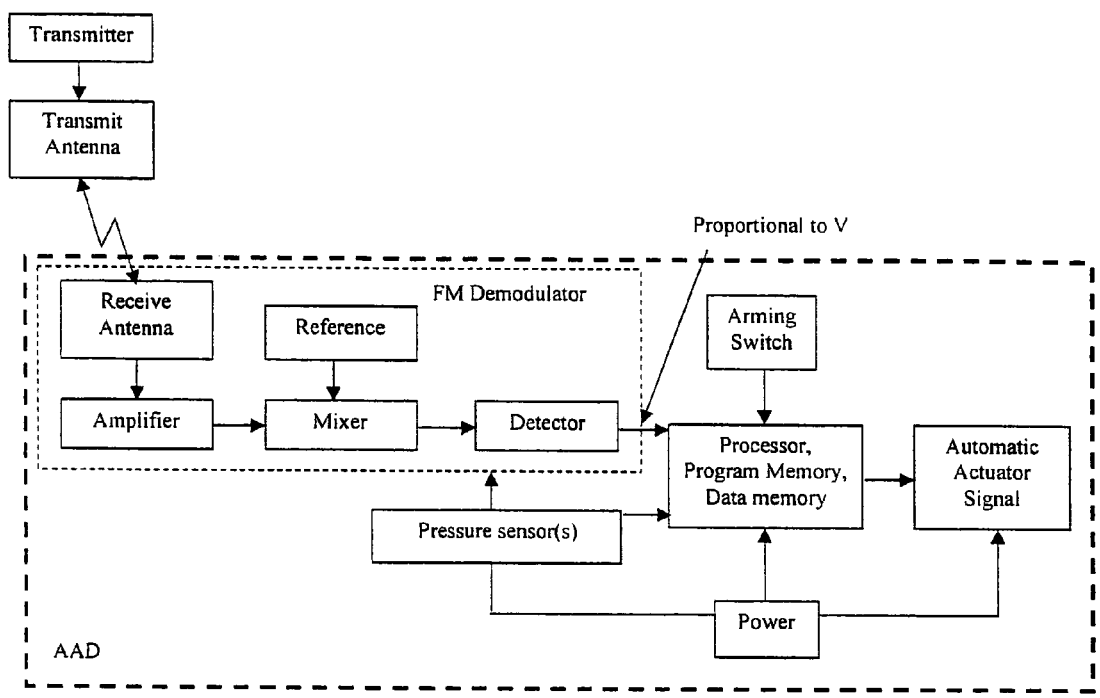
FIG. 2 shows the AAD and an external transmitter which is mounted on the aircraft.

In alternative implementations, the MEMS accelerometer/gyroscope sensors can be replaced by other range and rate detection sensors. For instance if an FM tone is transmitted from the jumper to a reflector on the aircraft and back to the jumper or from the aircraft to the jumper, the tone frequency detected by the jumper will be frequency shifted by the difference in relative velocity between the jumper and the aircraft (FIG. 2 shows the AAD and an external transmitter which is mounted on the aircraft). This Doppler shift can be detected using FM demodulation. In this case acceleration is determined as:

$$Aj = dV/dt \quad (3)$$

Jumper velocity as:

$$Vj = V + Va \quad (4)$$

And position is detected as:

$$Pj = Pa + \int (V + Va) dt, \quad (5)$$

Where:

Aj, Vj, and Pj are the jumper's acceleration, velocity and position,

Pa and Va are the plane's position and velocity, and

V is the relative velocity measurement by the FM detector.

Figure 3:
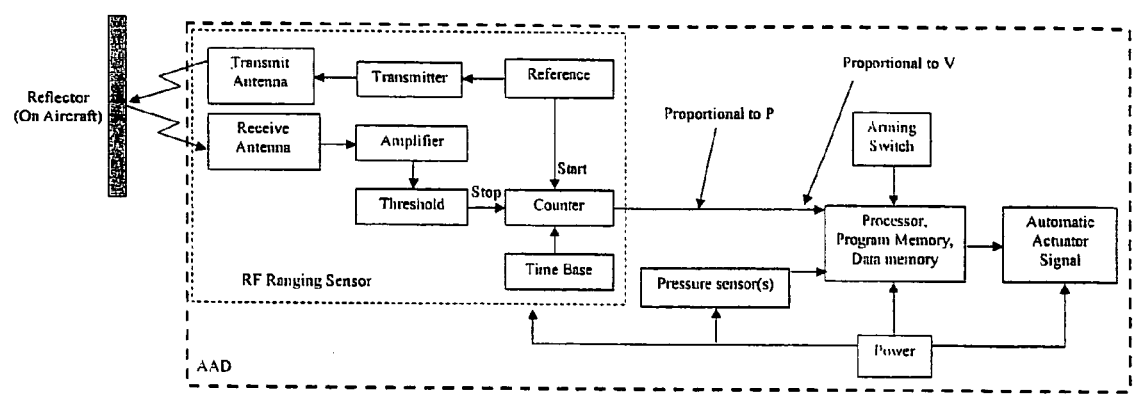
FIG. 3 shows the AAD and an external reflector which is mounted on the aircraft.

If a pulse is transmitted from the jumper to the aircraft and back, the time of flight can be measured against a precision crystal clock to accuracies of several centimeters (FIG. 3 shows the AAD and an external reflector which is mounted on the aircraft). This is range measurement determines the relative position of the jumper to the aircraft. In this case jumper position is determined as:

$$Pj = P + Pa \quad (6)$$

Jumper velocity as:

$$Vj = dPj/dt \quad (7)$$

And acceleration as:

$$Aj = dVj/dt \quad (8)$$

Where:

Aj, Vj, and Pj are the jumper's acceleration, velocity and position,

Pa is the plane's position and velocity, and

P is the relative distance from the plane to the jumper measured by ranging.

The preferred embodiment described further uses MEMS devices because they directly measure kinematics parameters (rather that indirectly through FM demodulation or time of flight). This makes calibration simpler for the MEMS systems and also has the added benefit of complete passivity (i.e. there are no detectable emissions from the sensor system—both FM and time of flight systems emit RF signatures to several times the range between the aircraft and where the chute deployment decision must be made—in a military applications this presents a detectable signal from the plane at ground level that can be used for detection and weapons targeting).

Three (or six) MEMS inertial devices are preferred because they measure all of the true components of body motion, whereas, FM demodulation and RF ranging only measure rate or range along the propagation direction of the RF emissions. This means that errors will be made in estimating jumper downward velocity based on the changing geometry between the emitting antenna and the jumper (i.e. the aircraft and the jumper). Furthermore, RF signals will degrade in quality based both on range from the aircraft and orientation of the jumper relative to the aircraft (i.e. if the jumper is tumbling, signal strength will vary due to the changing orientation of the receive and transmit antennae).

Circuit Design

Figure 4:
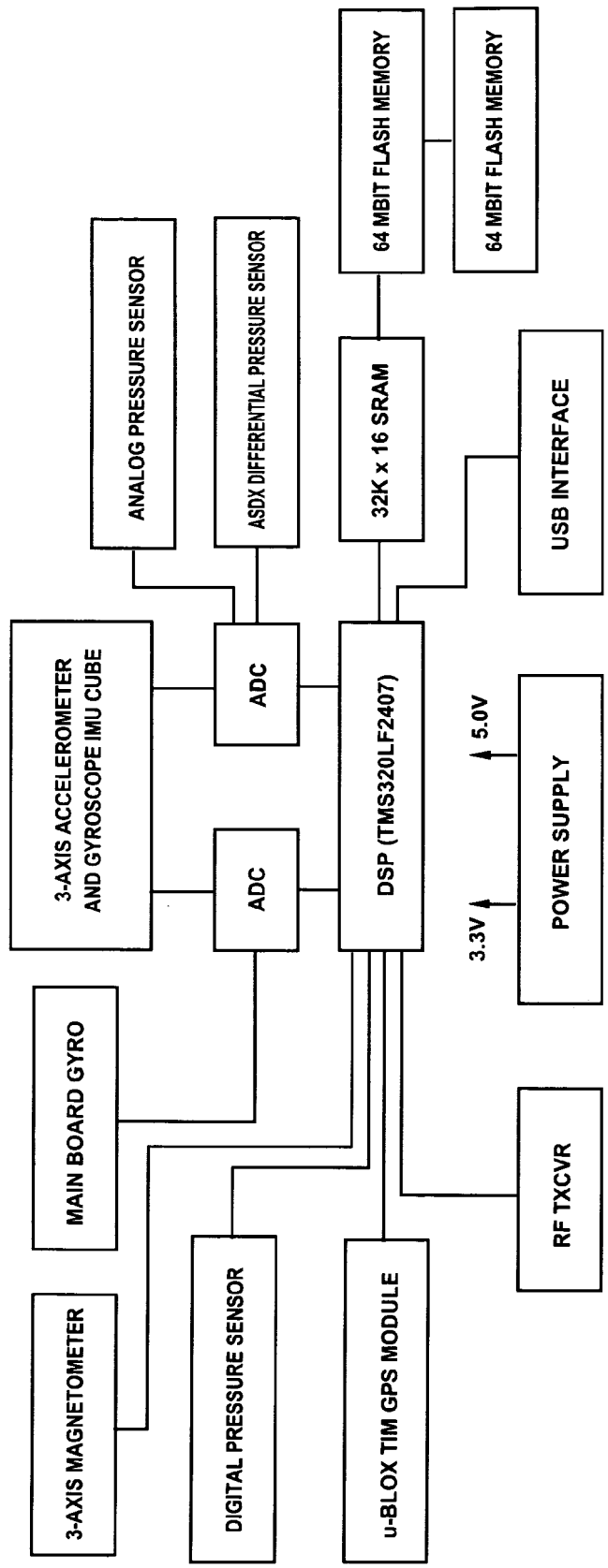
FIG. 4 shows the top-level block diagram of an AAD design with added sensors.

FIG. 4 shows the top-level block diagram of an AAD design with added sensors: 3 axis magnetometer (sensing direction from the Earth's magnetic field), 3 axis gyro and 3 axis accelerometer (shown as the 3 axis Accelerometer and Gyroscope IMU Cube), a redundant GPS receiver (for determining position by GPS satellite signal), and pressure sensors (Analog barometric pressure, Digital pressure, and Differential pressure or airspeed). This design can accomplish the data collection for both AAD and for recording full jumper trajectory during freefall and later decent after the chute is deployed to touchdown on the ground. Data collected in recording mode is entered into the flash memory for permanent storage until it is read out at an analysis station. This is done through either the USB interface or the RF TXCVR.

The GPS, magnetometer set, 3 gyroscope axes, differential pressure sensor, redundant barometric pressure sensor (digital or analog), and the record flash memory and analysis PC communications (USB and RF TXCVR) are not necessary for the AAD but are included to implement a jumper decent trajectory recording function as well. Not shown are I/O lines from the DSP to the arming switch and the AAD actuation device (normally a pyrotechnic that pulls the disconnect pin or bolt that releases the main or reserve chute).

Figure 5:
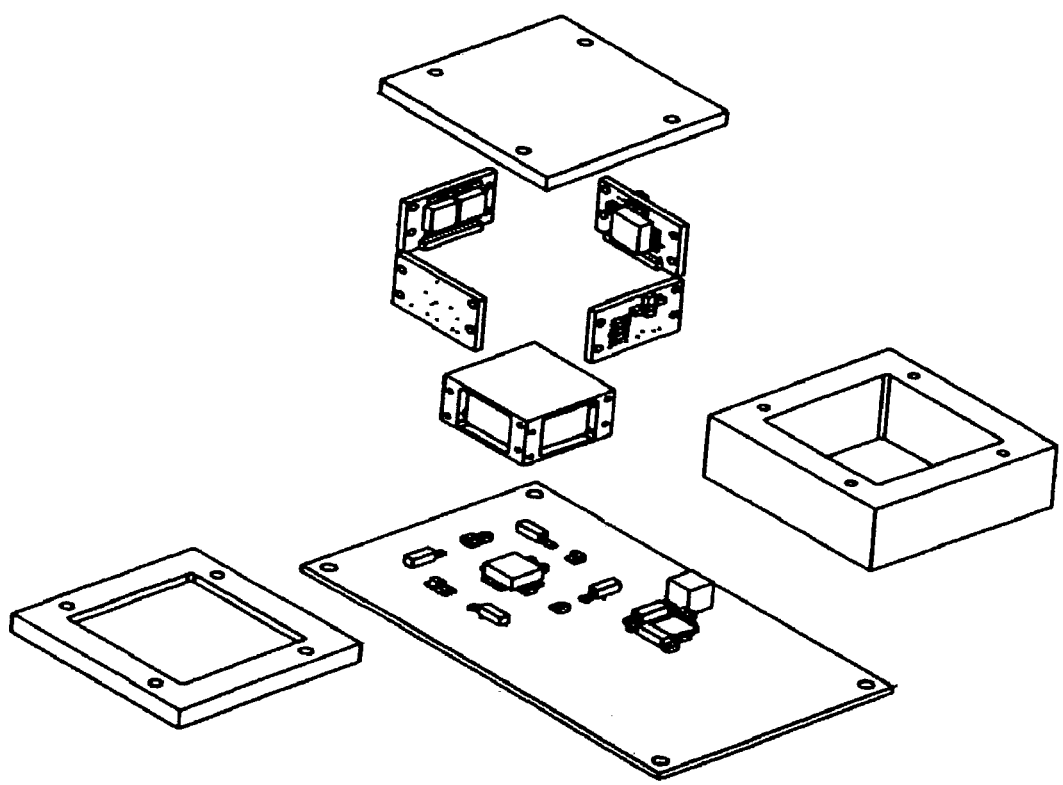
FIG. 5 shows how the critical 3 axes of accelerometer (and gyro if they are included) are packaged and mounted on an inertial daughterboard.

FIG. 5 shows how the critical 3 axes of accelerometer (and gyro if they are included) are packaged and mounted on the Inertial Daughterboard. This very compacted three dimensional packaging allows for (a) good temperature control (MEMS devices are highly temperature change sensitive), (b) rigid mounting, and (c) very compact form factor.

Detailed Algorithm Design

The heart of the AAD design is it software/firmware. In recording mode the device is powered and armed by pressing the user button. The DSP start up its program, initializes the attached sensors (see FIG. 4) and begins capturing data at the preprogrammed rate for each sensor (typically 100 Hz–10 Hz for magnetometer and GPS). Each sensor data item is inserted into the Flash memory buffer. Recording continues until the memory is full or the device is connected to an analysis station (a personal computer). In the recording mode the AAD/recorder can only be used one time before it is connected to the analysis station and has its data downloaded. The download process erases the flash memory and re-initializes the AAD/recorder for reuse when the current recorded data set is completely transferred into the analysis station.

In AAD mode, the device is powered and armed by pressing the user button. The DSP also start up its program, initializes the attached sensors (which can be subsetted to 3 axis accelerometer and a single pressure sensor), and begins data capture at 100 Hz. Each sensor data item may be recorded for later analysis (as in recording mode), but is also analyzed to detect malfunctions in the decent process. The principal goal of this processing is to determine when and if to release the actuator that deploy a main pr reserve parachute within nominally the first 5–8 seconds of the decent.

The phases of military jumping is as follows with the annotated failure modes and remediation.

TABLE 1

Failure modes and remediation

| Phase | Failure | Remediation |
|---|---|---|
| Pre-jump | Accidental chute deployment - not pulled out of aircraft | No aircraft exit is detected - no action |
| Pre-jump | Accidental chute deployment - pulled out of aircraft | Jumper is most likely injured. His exit is detected with change in pressure environment and due to acceleration of the rapid exit. If descent rate is nominal, no action. If main does not deploy properly so that descent is too fast, Action: deploy reserve. |
| At exit from aircraft | Jumper Tumbles | The jumper should not tumble because this may cause main chute entanglement. However, often this happens to jumpers, especially during training. Action: record jumper trajectory and report tumbling during exit to training supervisor. |
| At end of static line (main chute deployment point) | May be tangled in static line - main does not deploy and jumper is towed - this is called tow jumper failure | Detect towed condition by high deceleration. Take no initial action. Wait for detection of possible cutting of towline - descent that was halted begins. If this is detected Action: deploy reserve. Otherwise detect that jumper has been retrieved by monitoring the ambient pressure. In this case, do not deploy reserve. |
| At end of static line (main chute deployment point) | Static line pulls and detaches, main does not deploy | Descent rate to fast. Action: deploy reserve. |
| At end of static line (main chute deployment point) | Static line pulls and detaches, main deploys but only partially opens due to entanglement or other failure | Descent rate to fast. Action: deploy reserve. |
| Jumper tumbles | Main deploys but is partially below jumper due to tumbling | If tumbling causes entanglement in main this is detected as a partial chute failure by detecting increased descent rate compared to nominal. Action: deploy reserve. |

TABLE 1-continued

Failure modes and remediation

| Phase | Failure | Remediation |
|---|---|---|
| Jumper tumbles | Main deploys and jumper rights | No action - jumper's deceleration is close to nominal |

As indicated above the critical actions require that the AAD system:
 (1) Reliably detect exit from the aircraft (Exit Detection Algorithm)
 (2) Detect tow jumper case where the line fully extended, chute is not deployed, and the jumper is being dragged (Towed Jumper Algorithm)
 (3) Detect main failure or partial deployment which is from too rapid of a descent before chute is fully deployed (Severe Malfunction Detection Algorithm and Minor Malfunction Detection Algorithm)
 (4) Detect proper chute deployment so as to disable any further function accept recording (None of the above)
 (5) Record the descent trajectory data for after jump review with training supervisors.

Figure 6:
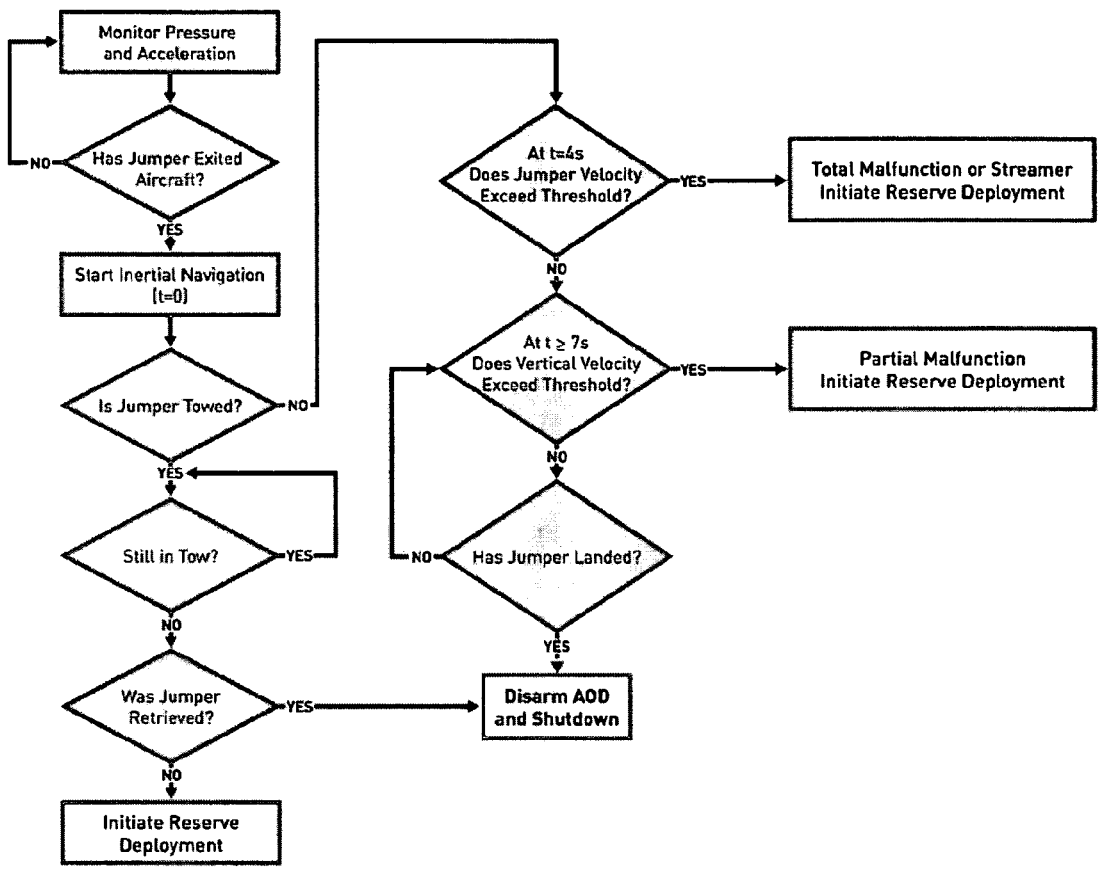
FIG. 6 displays the flow chart for the algorithm employed by the Automatic Activation Device.

FIG. 6 displays the flow chart for the algorithm employed by the Automatic Activation Device. This algorithm can be broken down into four separate sections. These sections are . . .
 1. Exit Detection Algorithm
 2. Towed Jumper Algorithm
 3. Severe Malfunction Detection Algorithm
 4. Minor Malfunction Detection Algorithm This list is chronological. First, the AAD determines when the jumper exits the aircraft. Then the AAD determines if the jumper is being towed. Only then does the AAD determine if a malfunction has occurred. Exit is detected first because a reference point in time is needed. All jumps begin with an exit from the aircraft. The towed jumper algorithm is next because deploying the reserve while a jumper is towed can be fatal. Therefore, the AAD must determine that the jumper is not towed before allowing malfunction detection to begin. The following sections describe each part of the AAD algorithm in detail.

The Exit Detection Algorithm

Figure 7:
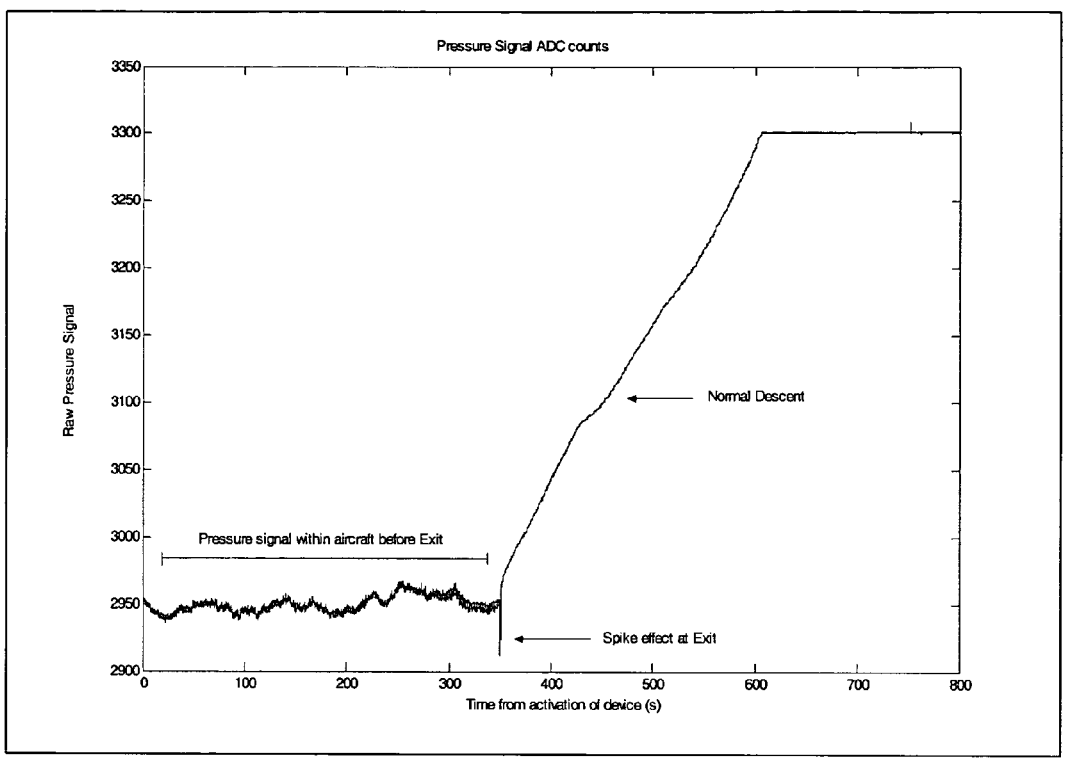
FIG. 7 shows the Ram-Air/Venturi Effect at Exit effect.

The first thing the algorithm does is to detect the jumper's exit by monitoring the pressure signal and looking for a large and distinct change. A high frequency spike is caused by the exposure of the pressure sensor's orifice to the turbulence surrounding the aircraft as well as the ram air and Venturi effects caused by entering the high velocity column of air directly outside of the aircraft. The Venturi effect describes the result of fast moving air over the top of the sensor which creates a low-pressure area within the orifice producing a pressure measurement lower than ambient. The ram air effect has the opposite result and occurs when the orifice is facing directly into the wind vector. This creates a local high-pressure area immediately within the orifice, which results in a pressure measurement higher than ambient. This effect, Ram-Air/Venturi Effect at Exit, is illustrated in FIG. 7.

A simple FIR filter is used to detect this spike. The filter has a length of 64 and is a purely causal filter, hence has a theoretical delay of zero. The Exit Detection Filter (EDF) coefficients are:

$$\left[\underbrace{111...1}_{16 \text{ bins}} \underbrace{000...0}_{46 \text{ bins}} \underbrace{-8-8}_{2 \text{ bins}}\right] EDF \text{ coefficients} \quad (9)$$

This filter has been verified by generating its output for all jumps performed and showing that a threshold can be set that will properly identify all exit times without any false detections.

To counteract the cases where large pressure variations in the aircraft could trigger a false exit, the pressure signal is monitored for 0.70 s after the filter detects a spike. During this 0.7 seconds, a consistent increase in pressure (drop in altitude) verifies a true exit. Hence for all practical purposes the exit detection algorithm has a delay of 0.86 s. Since there is no action that needs to be taken within 0.86 s, the delay is acceptable and there is no cumulative effect of this delay in the further branches of the algorithm.

Figure 8:
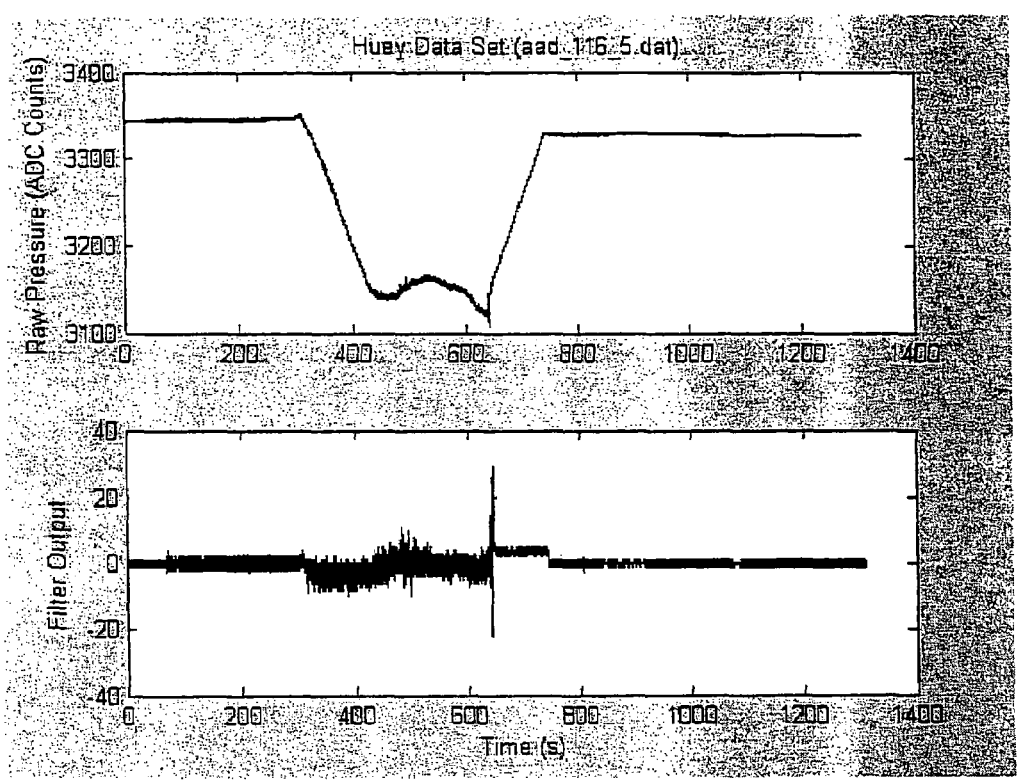
FIG. 8 shows how exit detection can be performed by examining pressure drop over a block (in this case 2 seconds) of time.

To handled cases where the Venturi effect is smaller, for instance when exiting a very slow moving platform like a helicopter at or near hover, pressure sensor changes are compared over a longer time interval so that the effect has time to develop as a result of the jumper's initial period of freefall descent. FIG. 8 shows how exit detection can be performed by examining pressure drop over a block (in this case 2 seconds) of time. The drop in pressure is proportional to a corresponding descent rate not possible while the jumper is still in the aircraft.

The Towed Jumper Algorithm

A towed jumper will experience a large variation in his/her total acceleration because of the varying forces exerted by the static line. A jumper who is not towed very little variation in total acceleration.

Figure 9:
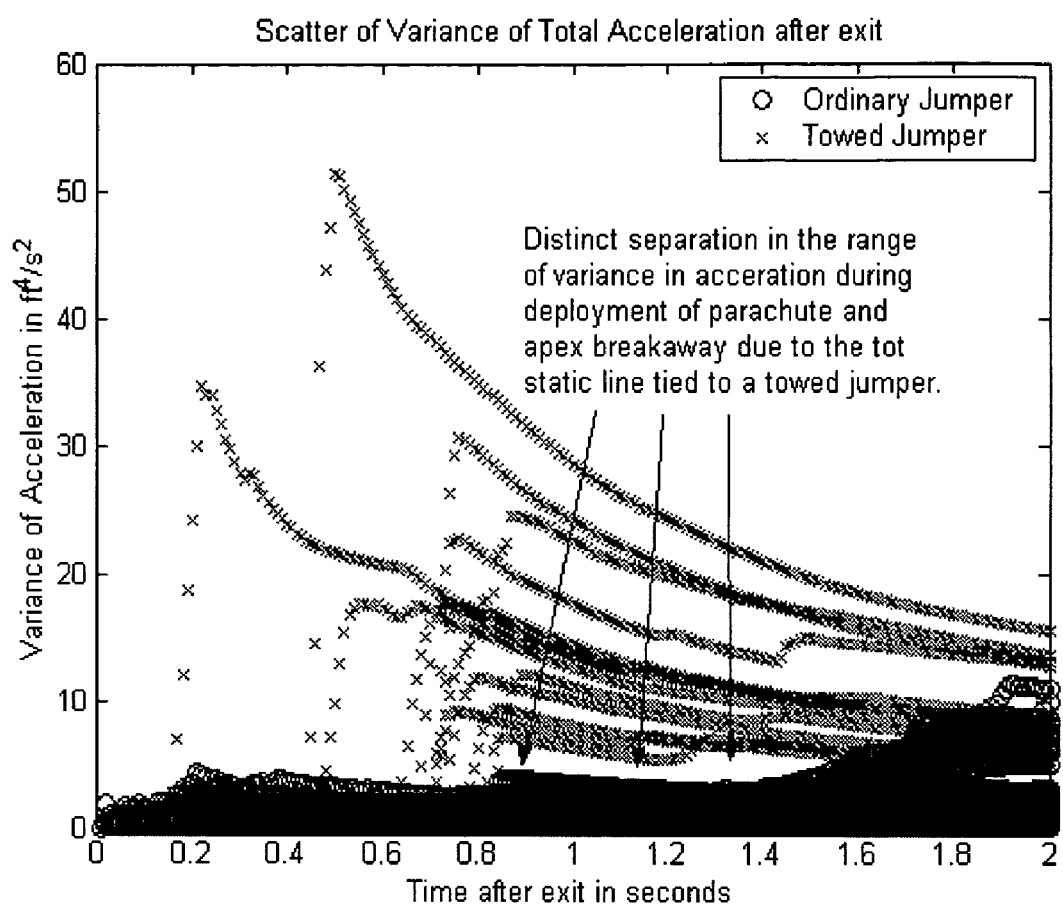
FIG. 9 is a scatter plot of the variance of the acceleration at different instants of time after exit, showing the separation between the ordinary jumper and towed jumper.

The above hypothesis has been verified from the accelerometer measurements obtained from field jumps. FIG. 9 is a scatter plot of the variance of the acceleration at different instants of time after exit, showing the separation between the ordinary jumper and towed jumper.

Based on a combination of maximum separation in the scatter and the need to make an early decision, the ideal time to detect a towed jumper was decided to be at t=1.0 s from exit which is between the average time for deployment bag separation and the average time for apex break away. See Table 1.

TABLE 1

Time Elapse for Key Points in T-10 Trajectory

| Trajectory Event | Average Time From Exit |
|---|---|
| Deployment Bag Separated | 0.8 sec |
| Apex Breakaway | 1.4 sec |
| Full Inflation | 2.8 sec |
| First vertical | 4.1 sec |
| Second Vertical | 6.5 sec |

The threshold for making the decision is 3.9046 ft$^4$/s$^2$. After detecting a towed jumper, the jumper is monitored for the possibilities of the towed jumper being cut-off or retrieved. This is important because deployment of a reserve when the jumper is retrieved should be avoided. Additionally, if the jumper is cut away, the AAD should deploy the reserve.

Detecting a Retrieved Towed Jumper and Cut-Off Towed Jumper:

While the jumper is being towed there is a very high variance in the pressure signal (altitude derived from pressure signal) because of the ram air and Venturi effects. This fact is used to observe the variance of the pressure signal. A significant drop in the variance indicates that the towed jumper has either been cut away or retrieved.

In the case of a jumper that has been cut away, the altitude decreases at a constant rate because the jumper is under free fall. This can be observed in FIG. 10 and is utilized to detect a cut away towed jumper and deploy the reserve.

Figure 11:
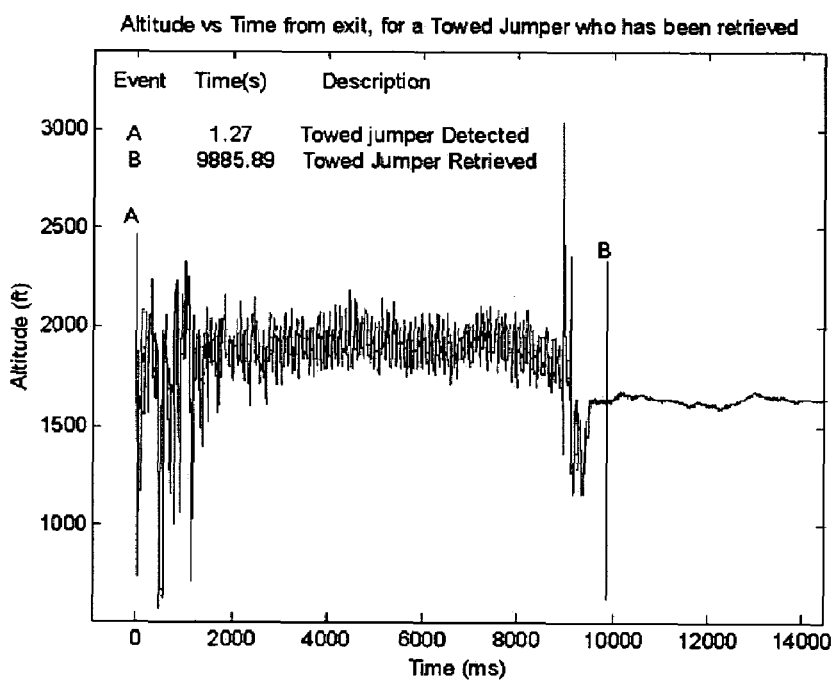
FIG. 11 shows that the pressure signal is constant in case of a retrieved jumper.

In the case of the towed jumper being retrieved, the constant drop in altitude cannot be observed. In FIG. 11 shows that the pressure signal is constant in case of a retrieved jumper.

The Severe Malfunction Detection Algorithm

Once it is certain that the jumper is not towed, it is safe for the malfunction detection algorithm to proceed. It is advantageous to begin with the severe malfunctions (total malfunction and 5 percent partial malfunction). This is because when there is no canopy above the jumper or it is just a streamer, there is very little time between exit and impact. Therefore, the sooner severe malfunctions can be detected, the better chance for survival of the jumper.

The Severe Malfunction Detection Algorithm was developed by calibrating the accelerometer sensor values. This yielded acceleration versus time in three orthogonal axes. (For simplicity we will call these axes $X_{AAD}$, $Y_{AAD}$, and $Z_{AAD}$.) These axes represent the frame of reference of the AAD itself.

Once the acceleration forces have been calibrated, an overall force is computed by performing a magnitude calculation and subtracting one G. One G is subtracted from the magnitude as it is known that the Earth's gravitational filed always exerts one G upon the AAD. (An AAD sitting on the shelf is experiencing one G, but it is not accelerating.)

$$\text{TotalAcceleration} = (\sqrt{[A_{X_{AOD}}]^2 + [A_{Y_{AOD}}]^2 + A[_{Z_{AOD}}]^2}) - 1.0 \quad (10)$$

This total acceleration is then integrated to yield total velocity.

$$\text{TotalVelocity}[n] \sum_{i=0}^{n} \text{TotalAcceleration}[i] \quad (11)$$

Analysis and experience has shown that this total velocity metric is key in the deciding whether or not a malfunction has occurred.

In order to develop and refine the algorithm, data was collected. This data included normal and malfunction scenarios. The malfunction scenarios were divided up into four categories. They are Total Malfunction, 5 percent Partial, 30 percent Partial, and Towed Jumper. A Total Malfunction occurs when no chute opens whatsoever. A 5 percent Partial occurs when the parachute only opens to 5 percent of its normal diameter. This malfunction is also referred to as a streamer. A 30 percent Partial occurs when the parachute only opens to 30 percent of its normal diameter. 30 percent of normal diameter is defined as the threshold between a malfunctioning chute and a normal deployment. A towed jumper malfunction occurs when the jumper is hung up on the static line.

Figure 12:
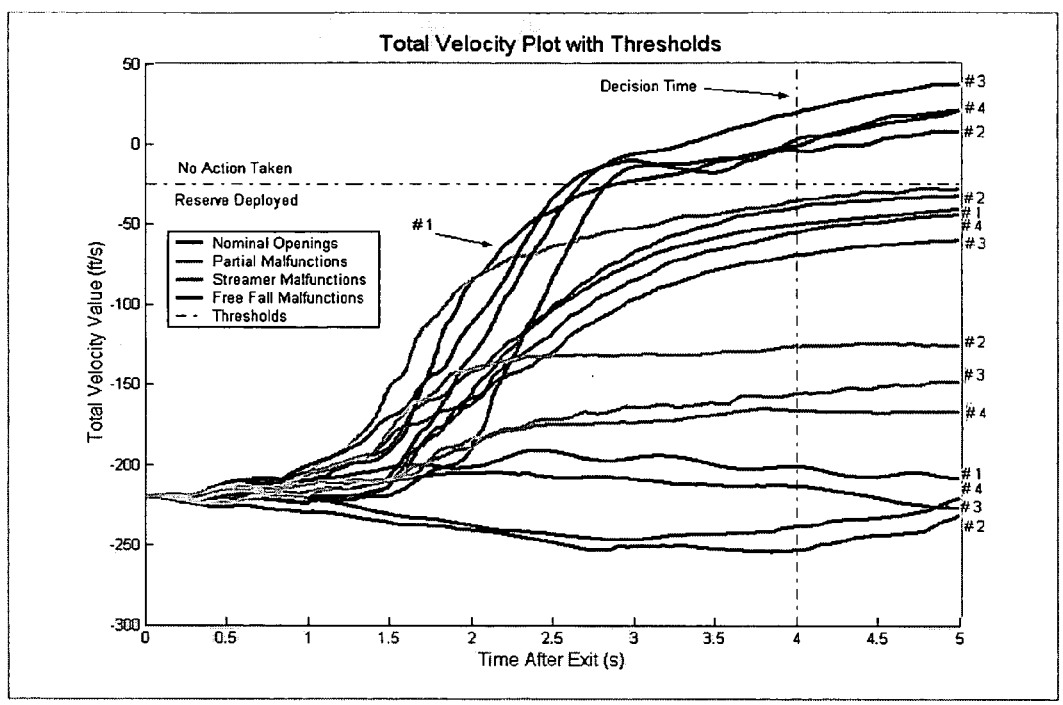
FIG. 12 shows an example of this type of plot for a very few data sets.

In order to differentiate between malfunctions and non-malfunctions, the total velocity data was analyzed. Each data set has a total velocity signature versus time and an associated malfunction. Each total velocity signature was plotted against time and is type coded. FIG. 12 shows an example of this type of plot for a very few data sets.

Figure 10:
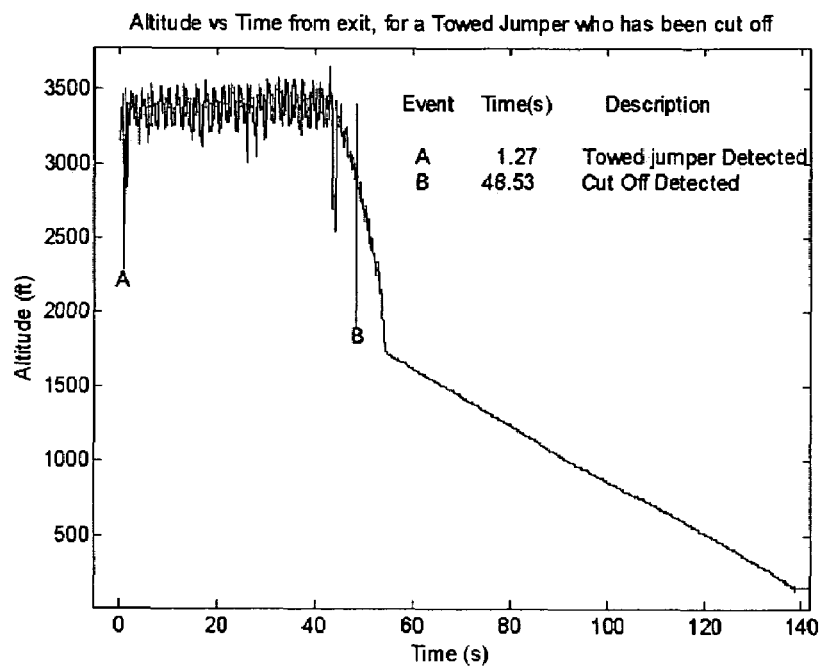
FIG. 10 illustrates the case of a jumper that has been cut away, showing how the altitude decreases at a constant rate because the jumper is under free fall.

At each point in time, starting with exit time (0 s in FIG. 11), a probability distribution function (PDF) of total velocity for each malfunction type is calculated. Therefore, at every index of time after exit, a PDF is created for all types of jumps. These PDFs are then analyzed in the total velocity dimension to evaluate the separation between PDFs. In FIG. 10, for instance, when time after exit is between zero and one second, separation among the malfunction jumps is unsatisfactory. When time after exit reaches four seconds, however, there is very good separation between the malfunction drops and the non-malfunction drops.

Once all of the PDFs have been created at every index of time after exit, the time which yields the best separation between malfunction and non-malfunction jumps is chosen as the decision time. The point in between the PDFs of the malfunctions and the PDFs of the non-malfunctions that produce the least amount of overlap become the total velocity threshold.

The Minor Malfunction Detection Algorithm

Once the overall algorithm has either detected a severe malfunction or determined that there has not been a severe malfunction, a final algorithm can be carried out to detect minor malfunctions. Minor malfunctions are classified as the 30 percent partial malfunctions. When a parachute only opens to 30 percent of its diameter, it is still stable. The only difference is that the chute does not decelerate the jumper enough. During a minor malfunction, the jumper is falling at a rate that is not safe.

To detect a minor malfunction, this portion of the algorithm uses the pressure sensor. During a minor malfunction, the signal from a pressure sensor is stable. The pressure signal is differentiated to determine how much the pressure is changing over time. Since pressure is directly related to altitude this is the same as computing the rate of change in altitude or the rate of descent. This portion of the algorithm monitors the rate of descent. If it is ever too high, then the algorithm initiates the reserve deployment. This check is made continuously until the jumper has landed safely on the ground.

Figure 13:
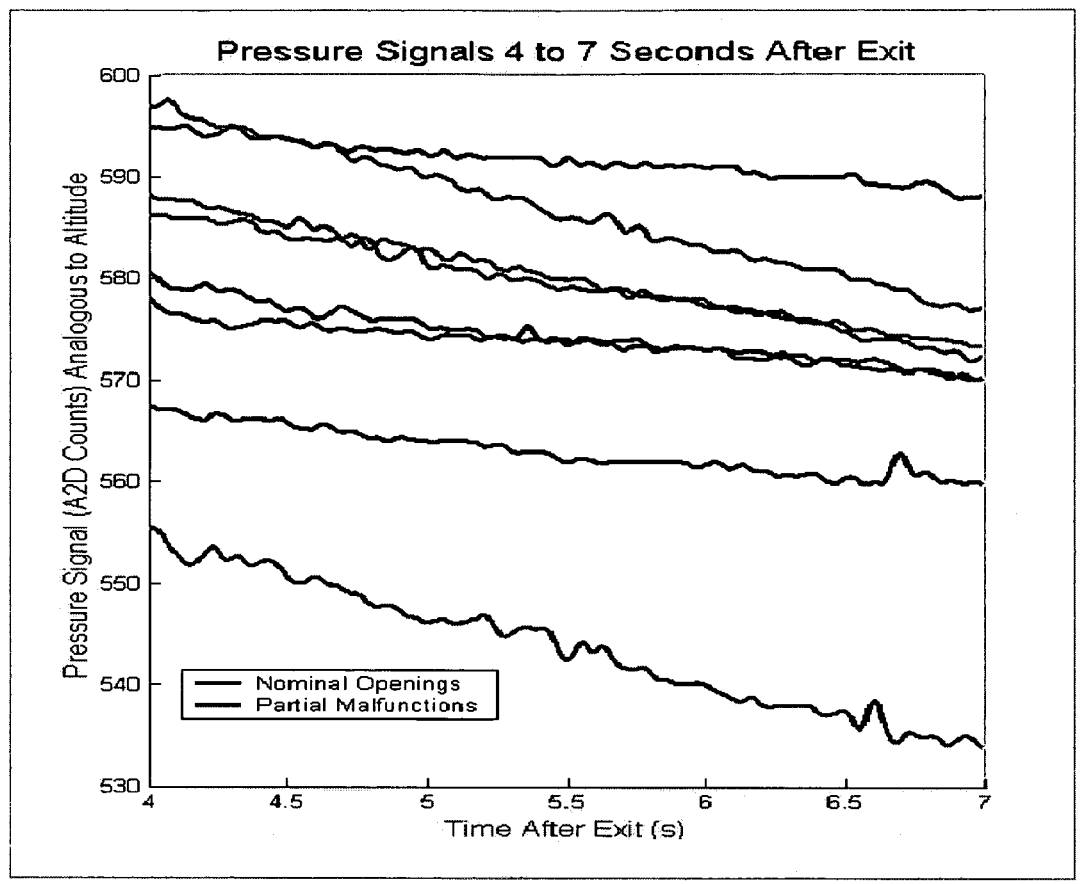
FIG. 13 provides examples of common pressure signals for both normal chute deployments and minor malfunction deployments.

Examples of common pressure signals for both normal chute deployments and minor malfunction deployments are shown in FIG. 13. It is clear that the minor malfunction plots show a faster descent than the non-malfunction plots

We claim:
1. Apparatus for determining when to automatically deploy a primary or reserve parachute, comprising:
   a plurality of accelerometers, each providing an output with respect to a different axis: and
   a processor for integrating the outputs of the accelerometer to determine velocity; and a mechanism for deploying the chute if the velocity exceeds a predetermined value.

2. The apparatus of claim 1, wherein the processor is further operative to determine the jumper's position.

3. The apparatus of claim 1, further including one or more devices for estimating the jumper's altitude based upon atmospheric pressure.

4. The apparatus of claim 1, wherein the accelerometers are MEMS accelerometers.

5. The apparatus of claim 1, further including plurality of gyroscopes, each providing an output with respect to a different axis; and
wherein the processor is further operative to determine position and orientation as a function of the outputs of the gyroscopes.

6. The apparatus of claim 5, wherein the gyroscopes are MEMS gyroscopes.

7. The apparatus of claim 1, including 3 accelerometers oriented along 3 orthogonal axes.

8. The apparatus of claim 5, including 3 accelerometers oriented along 3 orthogonal axes.

9. Apparatus for determining when to automatically deploy a primary or reserve parachute, comprising:

a plurality of accelerometers, each providing an output with respect to a different axis; and a plurality of gyroscopes, each providing an output with respect to a different axis;

a processor for determining position and orientation as a function of the outputs of the accelerators and gyroscopes, a mechanism for deploying the chute if the velocity or position are outside a safe range.

10. The apparatus of claim 9, including 3 accelerometers oriented along 3 orthogonal axes.

11. The apparatus of claim 9, including 3 gyroscopes oriented along 3 orthogonal axes.

12. The apparatus of claim 1, wherein the accelerometers are MEMS accelerometers.

13. The apparatus of claim 1, wherein the gyroscopes are MEMS gyroscopes.

* * * * *

UNITED STATES PATENT AND TRADEMARK OFFICE
CERTIFICATE OF CORRECTION

| | |
|---|---|
| PATENT NO. | : 7,073,752 B2 |
| APPLICATION NO. | : 10/972703 |
| DATED | : July 11, 2006 |
| INVENTOR(S) | : Voronka et al. |

Page 1 of 1

It is certified that error appears in the above-identified patent and that said Letters Patent is hereby corrected as shown below:

Column 1, line 10, insert:

-- GOVERNMENT SUPPORT

This invention was made with Government support under Contract No. DAAD16-99-C-0007 awarded by the United States Army. The Government has certain rights in the invention. --

Signed and Sealed this

Seventeenth Day of November, 2009

David J. Kappos
*Director of the United States Patent and Trademark Office*